(No Model.)

P. D. DUPONT.
TIRE SETTING MACHINE.

No. 587,035. Patented July 27, 1897.

WITNESSES:
W. V. Orcutt
J. Gautier

INVENTOR
Philippe D. Dupont
BY
O. W. Orcutt
ATTORNEY.

UNITED STATES PATENT OFFICE.

PHILIPPE D. DUPONT, OF ST. JOHNSBURY, VERMONT, ASSIGNOR OF ONE-HALF TO JOSEPH GAUTHIER, OF SAME PLACE.

TIRE-SETTING MACHINE.

SPECIFICATION forming part of Letters Patent No. 587,035, dated July 27, 1897.

Application filed October 12, 1896. Serial No. 608,577. (No model.)

*To all whom it may concern:*

Be it known that I, PHILIPPE D. DUPONT, a citizen of the United States, residing at St. Johnsbury, in the county of Caledonia and State of Vermont, have invented a new and useful Tire-Setting Machine, of which the following is a specification.

My invention relates to improvements in the tire-setting machines in which a continuous pressure is brought to bear around the entire circumference of the tire at the same time by mechanical means.

The objects of my improvement are, first, to provide a series of levers operated by a central screw which will give a continuous and steady pressure to all parts that are in operation; second, to provide means for operating the same either by the application of motive power or by hand. I attain these objects by the mechanism illustrated in the accompanying drawings, in which—

Figure 1:
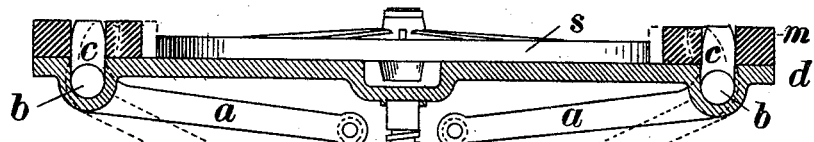
Figure 2:
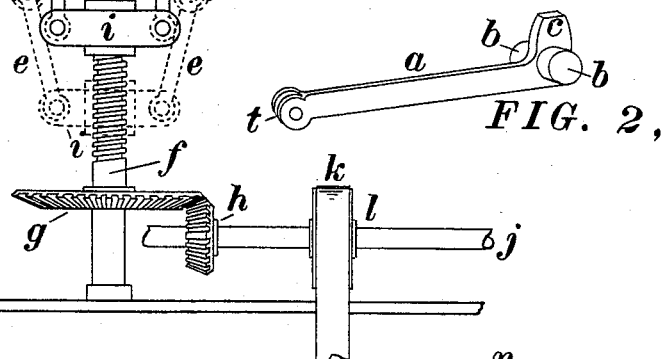
Figure 3:
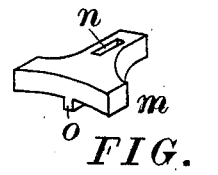

Figure 1 is a vertical section of the operating parts of the machine. Fig. 2 is a view of one of the levers; Fig. 3, a view of one of the tire-blocks, and Fig. 4 a top view of the whole machine.

Similar letters refer to similar parts of the machine.

The circular plate $d$, supported on any suitable framework of wood, stone, or other material, constitutes the framework of the machine.

The series of levers $a$, connected to nut $i$ by links $e$, operated by the screw $f$, on which is gear $g$, actuated by pinion $h$ on shaft $j$, constitute the mechanism by which pressure-blocks $m$ are forced up to the work.

Figure 4:
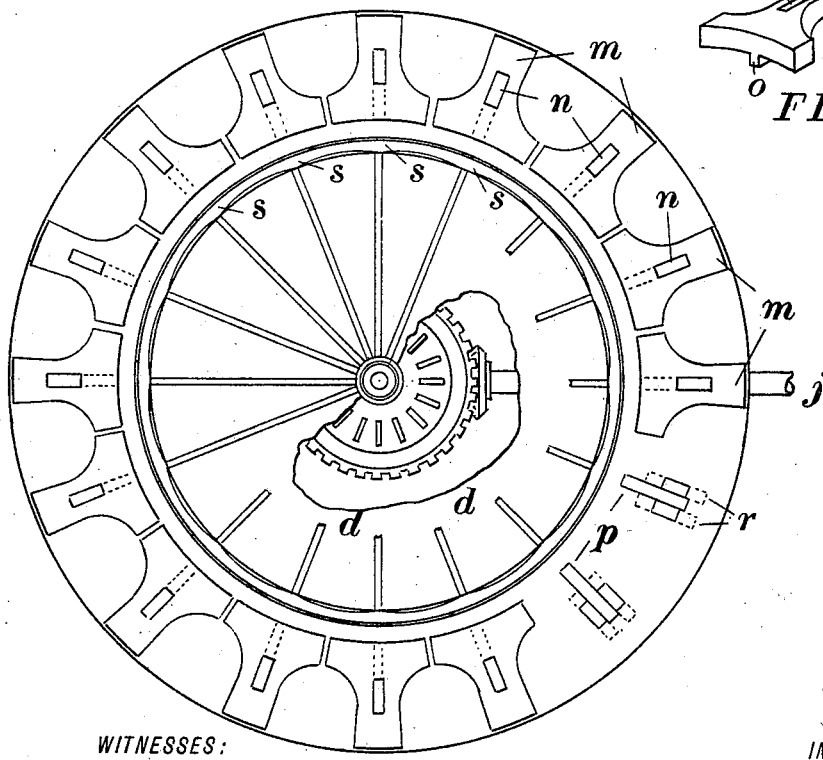

The lever $a$ is provided with lugs or trunnions $b$, which fit into recesses in the plate $d$, as shown at $r$, Fig. 4, leaving the end $c$ of lever $a$ projecting above plate $d$ sufficiently to receive pressure-block $m$. The inner end of lever $a$ is connected to nut $i$ by links $e$. Plate $d$ is provided with radial slots, in which guides $o$ of pressure-blocks $m$ slide and by means of which the pressure-blocks $m$ are guided to the work.

$n$, Fig. 4, shows a mortise through pressure-block $m$, into which the end $c$ of lever $a$ fits.

$s$ is a wheel in position on the machine.

$p$ is a slot in plate $d$ where the end $c$ of lever $a$ comes up through to engage pressure-block $m$.

In Fig. 1, $j$ is a shaft driven by belt $k$ on pulley $l$, or shaft $j$ may be revolved by means of a hand-crank at the extreme outer end. On the inner end of shaft $j$ is keyed a pinion $h$, which engages gear $g$. Gear $g$ is keyed fast to screw $f$. The revolution of the screw $f$ by means of gearing just mentioned draws the nut $i$ down, and the series of levers $a$ being connected to nut $i$ by means of links $e$ are correspondingly depressed, whereby the ends $c$ of the levers $a$ are forced inward, carrying with them pressure-blocks $m$, which, being forced against the tire, drive it inward and compress it. When the compression has been sufficiently accomplished, the motion of shaft $j$ is reversed and the parts all returned to their normal condition.

I am aware that tire-setting machines having movable blocks have been made. I therefore do not claim such invention broadly; but What I do claim as my invention, and desire to secure by Letters Patent, is—

In a tire-setting machine, the combination of a screw-threaded shaft $f$ and means for rotating the same with a wheel-supporting plate or frame supported by the said shaft, an annular series of pressure-blocks on the face of the said plate and movable toward or from the center thereof, a series of angular levers $a$ pivoted to the said plate and entering recesses or openings in the said blocks in order that each lever may move a block inward or outward, a nut movable up or down by the threads of the shaft and links connecting the said nut to the said levers in order that they may be actuated by the said nut substantially as set forth.

PHILIPPE D. DUPONT.

In presence of—
O. W. ORCUTT,
JOSEPH GAUTHIER.